United States Patent
Patterson et al.

(10) Patent No.: US 8,746,270 B2
(45) Date of Patent: Jun. 10, 2014

(54) PRECISION LOW FLOW RATE FLUID DELIVERY SYSTEM AND METHODS FOR CONTROLLING SAME

(75) Inventors: Bruce Patterson, Prince George (CA); Glenn Duke, Coquitlam (CA); Robert Johnstone, Edmonton (CA)

(73) Assignee: BRG Industries Incorporated, Prince George (CA)

( * ) Notice: Subject to any disclaimer, the term of this patent is extended or adjusted under 35 U.S.C. 154(b) by 436 days.

(21) Appl. No.: 12/703,656

(22) Filed: Feb. 10, 2010

(65) Prior Publication Data
US 2011/0192600 A1    Aug. 11, 2011

(51) Int. Cl.
*F16K 31/02* (2006.01)

(52) U.S. Cl.
USPC .......... 137/10; 137/486; 137/487.5; 700/282; 702/47

(58) Field of Classification Search
USPC ............. 137/10, 486, 487.5; 700/282; 702/47
See application file for complete search history.

(56) References Cited

U.S. PATENT DOCUMENTS

| | | | |
|---|---|---|---|
| 4,356,840 A | 11/1982 | Friedland et al. | |
| 5,022,428 A | 6/1991 | Vilines | |
| 5,118,008 A | 6/1992 | Williams | |
| 5,282,490 A | 2/1994 | Higgs | |
| 5,286,175 A | 2/1994 | Hammonds | |
| 5,312,233 A | 5/1994 | Tanny et al. | |
| 5,331,995 A * | 7/1994 | Westfall et al. | 137/8 |
| 5,344,044 A | 9/1994 | Hayden et al. | |
| 5,629,863 A | 5/1997 | Palozzi et al. | |
| 6,203,759 B1 | 3/2001 | Pelc et al. | |
| 6,213,853 B1 * | 4/2001 | Gonzalez-Martin et al. | 451/287 |
| 6,293,429 B2 | 9/2001 | Sadler et al. | |
| 6,471,487 B2 * | 10/2002 | Keilty et al. | 417/26 |
| 6,592,825 B2 | 7/2003 | Pelc et al. | |
| RE38,281 E | 10/2003 | Tisone | |
| 6,962,658 B2 | 11/2005 | Neyer et al. | |
| 7,066,353 B2 | 6/2006 | Hammonds | |
| 7,114,517 B2 * | 10/2006 | Sund et al. | 137/487.5 |
| 7,396,512 B2 | 7/2008 | DiTrolio et al. | |
| 7,465,382 B2 | 12/2008 | Paul et al. | |
| 2001/0001467 A1 | 5/2001 | Sadler et al. | |
| 2009/0090174 A1 | 4/2009 | Paul et al. | |
| 2009/0205409 A1 | 8/2009 | Ciavarini et al. | |
| 2010/0089456 A1 * | 4/2010 | Lowery | 137/1 |

FOREIGN PATENT DOCUMENTS

WO    0104718    1/2001

\* cited by examiner

*Primary Examiner* — William McCalister
(74) *Attorney, Agent, or Firm* — Oyen Wiggs Green & Mutala LLP (57) ABSTRACT

A method is provided for controllably delivering an additive fluid into a host fluid in a target system at a desired volumetric flow rate. The method comprises: providing a binary supply injector connected in an additive fluid delivery system between a pressurized supply of the additive fluid and the target system. The binary supply injector is controllable between an ON state which permits flow of the additive fluid therethrough and an OFF state which prevents flow of the additive fluid therethrough. The method involves iteratively repeating: estimating a volumetric flow rate of the additive fluid between the pressurized supply and the target system; and if the estimated volumetric flow rate of the additive fluid is greater than the desired volumetric flow rate, controlling the supply injector to its OFF state; or if the estimated volumetric flow rate of the additive fluid is less than the desired volumetric flow rate, controlling the supply injector to its ON state. Additive fluid delivery systems are also provided.

27 Claims, 6 Drawing Sheets

PRECISION LOW FLOW RATE FLUID DELIVERY SYSTEM AND METHODS FOR CONTROLLING SAME

TECHNICAL FIELD

The invention relates to systems for delivering fluids at controlled volumetric flow rates. Particular embodiments provide systems for controllably delivering fluids at precisely specified volumetric flow rates having relatively fine controllable increments over a relatively wide range of flow rates.

BACKGROUND

In some applications, there is a desire to add relatively small amounts of additive fluid in precise proportion to relatively large amounts of a host fluid. By way of non-limiting example, there are applications where it is desired to add relatively small amounts of a marker dye (an additive fluid) in precise proportion to relatively large amounts of fuel (a host fluid). For example, in some applications there is a desired to add marker dye to fuel in a ratio of 14 ppm±1 ppm or 0.0014%±0.0001%. In some such applications, it may be desirable that the additive fluid and the host fluid be separately stored and that the additive fluid be added to the host fluid as and when the combined fluid is required (e.g. while the host fluid is being dispensed for a particular application). In the case of marker dye and fuel, for example, separate storage and addition of the marker dye to the fuel at the time of dispensing can eliminate the need to store and/or transport dyed fuel separately from undyed fuel. In some applications, it can be desirable to add the additive fluid to the host fluid at a controllable volumetric flow rate. By way of non-limiting example, when a host fluid is being dispensed at a particular flow rate, it can be desirable to control the flow rate at which additive fluid is added to the host fluid, to maintain or track a desired relationship between the dispensing flow rate of the host fluid and additive flow rate of the additive fluid. In some applications, it can be desirable to add the additive fluid to the host fluid at a controllable volumetric flow rate that is controllable in relatively small increments and is controllable over a relatively wide range of flow rates. By way of non-limiting example, when fuel can be dispensed at a rate in a range of x-y milliliters per second (ml/s) and it is desired to add dye at a flow rate of z % of the fuel dispensing rate at an accuracy of ±w %, then it is desirable that the controllable range of dye delivery be at least $10^{-2}$ x·z ml/sec-$10^{-2}$ y·z ml/sec and that this dye delivery be controllable increments as small as $10^{-4}$ x·z·w ml/sec.

BRIEF DESCRIPTION OF DRAWINGS

In drawings which illustrate non-limiting embodiments.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Embodiments of the invention provide electronically controlled fluid delivery systems capable of controllably delivering desired volumetric flow rates of an additive fluid into a host fluid. A feature of some embodiments is that they can deliver volumetric flow rates of additive fluid at flow rates of less than 1,000 nano-liters per second (nl/s). In some embodiments, this flow rate is less than 25 nl/s. A feature of some embodiments is that the controllably delivered flow-rate is adjustable by fine increments across a relatively wide range of flow rates. For example, some embodiments provide fluid delivery systems capable of delivering additive fluid at flow rates ranging from less than 10 µl/s to more than 100 µl/s at controllable increments of less than 25 nl/s. Expressed in another way, such embodiments provide fluid delivery capability characterized by a ratio of the controllable flow rate range to the controllable flow rate increment that is 3,600:1 or greater. In some particular embodiments, flow rates can range from 5 µl/s to more than 200 µl/s at controllable increments of less than 10 nl/s. The ratio of flow rate range to controllable flow rate increment in such embodiments is 19,500:1 or greater.

Figure 1:
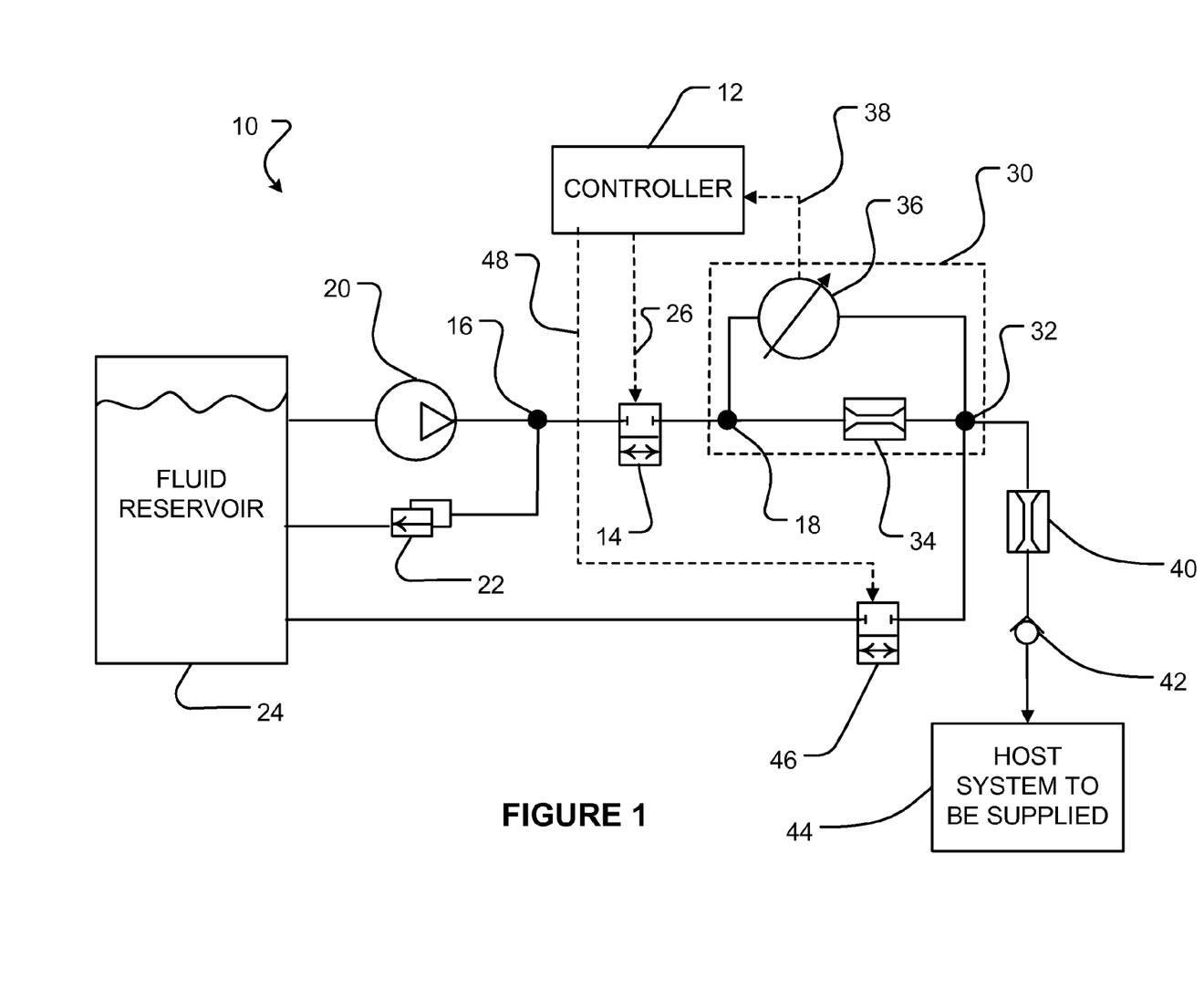
FIG. 1 is a schematic view of a fluid delivery system according to an example embodiment.

FIG. 1 is a schematic illustration of fluid delivery system 10 according to an exemplary embodiment. Fluid delivery system 10 delivers an additive fluid from reservoir 24 into a host system 44 to be supplied. In some embodiments, host system 44 may comprise a delivery system for a host fluid (not expressly enumerated). Fluid delivery system 10 may be automatically controlled, at least in part, by controller 12. Controller 12 uses information obtained from feedback subsystem 30 to control the operation of supply injector 14 which is connected between a supply node 16 and a regulated node 18. Controller 12 may also control optional relief injector 46 in some circumstance(s) to reduce the impact of additive fluid which may accumulate in system 10.

Additive fluid is stored in reservoir 24. In the illustrated embodiment, additive fluid from reservoir 24 is provided at a desired pressure at supply node 16 by the combination of pump 20 and pressure regulator 22. The particular desired pressure at node 16 may depend on the pressure budget of system 10, which may in turn depend on the pressure head at host system 44 and on the pressure drop associated with the other components (e.g. restriction conduit 34) of system 10 between supply node 16 and host system 44. In some embodiments, the desired pressure at supply node 16 is in a range of 50-500 psi. In other embodiments, this range is 80-200 psi. Pump 20 operates to deliver fluid from reservoir 24 to supply node 16. If the pressure at supply node 16 exceeds the desired level, then pressure regulator 22 opens to return excess fluid to reservoir 24. Pressure regulator 22 may be adjustable to facilitate corresponding adjustment of the desired pressure level at supply node 16. In some embodiments (not shown), pressure regulator 22 is adjusted by controller 12 which sends a suitable calibration signal to pressure regulator 22. Together, pump 20 and pressure regulator 22 supply additive fluid from reservoir 24 to supply node 16 at relatively constant pressure. In other embodiments, additive fluid may be supplied to supply node 16 at a desired pressure using other means (e.g. different types of pumps which may have different pressure/flow rate curves or the like).

Supply node 16 is connected (i.e. in fluid communication with) the input side of supply injector 14. Supply injector 14 may comprise a binary supply injector—that is, a supply injector having two states: closed and open. Supply injector 14 is normally closed to prevent fluid flow from supply node 16 to regulated node 18. Supply injector 14 opens under the influence of a control signal 26 (typically an electronic control signal 26) from controller 12 to allow fluid flow between supply node 16 and regulated node 18. In some embodiments, supply injector 14 comprises a one way valve mechanism or the like which permits fluid flow in one direction only (i.e. from its input side at supply node 16 to its output side at regulated node 18). However, such a one way valve mechanism is not required. During typical operation, the pressure of additive fluid at supply node 16 will be greater than the pressure of additive fluid at regulated node 18, substantially preventing reverse flow (i.e. from regulated node 18 to supply node 16) when supply injector 14 is open. In one particular embodiment, supply injector 14 comprises a model No. SL4-0650 EV1 injector from RC Engineering, Inc. of Torrance, Calif. In other embodiments, supply injector may be provided by other component(s). The particular selection of supply injector 14 may depend on the pressure at supply node 16, the pressure budget of system 10, the pressure head at host system 44, the flow rate of additive fluid in system 10 and/or characteristic(s) of the additive fluid.

System 10 includes a feedback subsystem 30 for providing information (e.g. an electronic signal) 38 which may be used by controller 12 to estimate, and to thereby control, the volumetric rate of additive fluid flow between regulated node 18 and delivery node 32. The flow rate between regulated node 18 and delivery node 32 is reflective of the flow rate of additive fluid into to host system 44, as described in more detail below. In the illustrated embodiment, feedback subsystem 30 comprises a restriction conduit 34 with known geometry (e.g. interior cross-section and length). In some embodiments, depending on flow rate, it may be desirable to have knowledge of some metric relating to surface characteristics (e.g. roughness) of the interior surface of restriction conduit 34. Non-limiting examples of such a metric include: the absolute (mean height of) roughness (k), the relative roughness (k/D) where D is the conduit diameter and the Darcy-Weisbach friction factor $\lambda$. The roughness of the interior surface of restriction conduit 34 has an impact on flow rate estimation at higher (e.g. turbulent) flow rates. Feedback subsystem 30 of the illustrated embodiment also comprises a differential pressure sensor 36 which measures or senses the differential pressure between regulated node 18 and delivery node 32 and provides a differential pressure feedback signal 38 to controller 12. In one particular exemplary embodiment, pressure sensor 36 comprises a model No. 5000 sensor from American Sensor Technologies, Inc. of Mt. Olive, N.J. In other embodiments, pressure sensor 36 may be provided by other component(s). The particular selection of pressure sensor 36 may depend on the pressure sensitivity range and accuracy requirements, characteristic(s) of the additive fluid and/or characteristics of the desired output signal. While not expressly shown in the illustrated embodiment, feedback subsystem 30 may comprise signal conditioning components (e.g. amplifiers, analog-to-digital converters (ADCs), filters and/or the like) in the path of differential pressure feedback signal 38 between sensor 36 and controller 12. The type and configuration of such signal conditioning components are understood to those skilled in the art.

It will be appreciated by those skilled in the art that differential pressure sensor 36 could alternatively be implemented by a pair of pressure sensors configured to measure the pressure at regulated node 18 and at delivery node 32 and to provide a corresponding pair of pressure feedback signals. Such signals could be compared in the analog domain (e.g. using a differential amplifier or the like) or could be provided to controller 12, whereupon controller 12 could determine the differential pressure between regulated node 18 and delivery node 32.

Restriction conduit 34 and sensor 36 may be chosen such that the typical differential pressure between regulated node 18 and delivery node 32 for a given system 10 is within the generally linear range of differential pressure sensor 36. This is not necessary, however, and controller 12 can be calibrated with information relating to a curve that defines the relationship between the output of sensor 36 and the differential pressure, such that controller 12 can accurately predict the differential pressure between regulated node 18 and delivery node 32 based on feedback signal 38. Such a curve may be characterized or approximated by suitable calibration parameters, a suitable look-up table and/or the like.

Feedback signal 38 may be related in a predicable way to the volumetric flow rate in restriction conduit 34 and controller 12 may use feedback signal 38 to estimate this volumetric flow rate. For laminar flow conditions, assuming that gravitational effects are negligible and given a pressure differential of $\Delta p$ (as provided by feedback signal 38), the volumetric flow rate Q of additive fluid through restriction conduit 34 may be estimated according to:

$$Q = \frac{\Delta P}{R} \quad (1)$$

where R is a term describing the fluidic resistance of restriction conduit 34. Equation (1) is a general equation describing laminar flow which applies regardless of the geometry of restriction conduit 34. For a cylindrically shaped conduit, the fluidic resistance under laminar flow conditions is given by:

$$R = \frac{8\eta L}{\pi r^4} \quad (2)$$

where L is the length of the conduit, r is the radius of the conduit and $\eta$ is the dynamic viscosity of the additive fluid. The theoretical fluidic resistance R of a particular restriction conduit 34 for a particular additive fluid may therefore be calculated based on the geometry of the restriction conduit 34 and the dynamic viscosity $\eta$ of the additive fluid. In practice, the value of the fluidic resistance R may be calibrated (e.g. offset and/or scaled) or experimentally determined (for a particular fluid and configuration of system 10) using suitably designed calibration experiments before being used by controller 12 to relate the pressure differential $\Delta p$ (as provided by feedback signal 38) to the volumetric rate of flow Q and to thereby control system 10.

A similar expression may be developed which relates the pressure differential $\Delta p$ to the volumetric rate of flow Q for turbulent flow conditions. The general expression that describes the pressure drop in a circular conduit is given by:

$$\Delta P = \frac{\rho \bar{v}^2}{2} \times \frac{L}{D} \lambda \quad (3)$$

where: D is the diameter of the conduit (i.e. D=2r); $\rho$ is the density of the additive fluid; $\bar{v}$ is the linear fluid velocity which, for a cylindrical conduit, is related to the volume flow rate Q and conduit radius r according to $$\bar{v} = \frac{Q}{\pi r^2};$$

and λ is the so-called Darcy-Weisbach friction coefficient. In general, the Darcy-Weisbach friction coefficient λ is related to the Reynolds number (Re) which is given by:

$$Re = \frac{\bar{v}D\rho}{\eta} = 2\frac{Q\rho}{\eta\pi r} \quad (4)$$

As is well known in the art, the Reynolds number (Re) determines the boundary between laminar and turbulent flow, with Re<2320 generally considered to be laminar flow and Re>2320 generally considered to be turbulent flow. For the case of laminar flow in a cylindrical conduit, the Darcy-Weisbach friction coefficient λ has been analytically determined to be $$\lambda = \frac{64}{Re}$$

and equations (3) and (4) can be combined to yield the equation (1) and (2) relationships between pressure differential ΔP and volumetric flow rate Q. For the case of turbulent flow, the relationship between the Darcy-Weisbach friction coefficient λ and the Reynolds number (Re) is a more complex one given in implicit form by the so-called Colebrook equation:

$$\frac{1}{\sqrt{\lambda}} = -2\log\left(\frac{2.51}{\lambda Re} + 0.269\frac{k}{D}\right) \quad (5)$$

where k is the absolute (mean height of) roughness of the interior surface of the conduit. The value of the Darcy-Weisbach friction coefficient λ (which is implicit in equation (5)) may be estimated using numeric iteration techniques. Once λ is determined, equation (3) together with the relationship $$\bar{v} = \frac{Q}{\pi r^2}$$

may be used to solve for the fluidic resistance R which relates the volumetric flow rate Q to the pressure differential ΔP across restriction conduit 34 in accordance with equation (1).

It will be appreciated that the fluidic resistance R is not constant for turbulent flow and depends on the Reynolds number which in turn depends on the flow rate Q itself. In practice, controller 12 may be configured to have access to a suitable look up table which provides different values of the fluidic resistance R (e.g. $R_1, R_2, R_3 \ldots R_n$) for different ranges of volumetric flow rates Q (e.g. $Q_0<Q\leq Q_1$, $Q_1<Q\leq Q_2$, $Q_2<Q\leq Q_3 \ldots Q_{n-1}<Q\leq Q_n$) or for different Reynolds number Re (e.g. $Re_0<Re\leq Re_1$, $Re_1<Re\leq Re_2$, $Re_2<Re\leq Re_3 \ldots Re_{n-1}<Re\leq Re_n$). Controller 12 can then perform a double check to ensure that it is using an appropriate fluidic resistance value for its flow rate conclusion and, if necessary, revise the fluidic resistance value. As is the case for laminar flow, fluidic resistance values determined for turbulent flow may be calibrated (e.g. offset and/or scaled) or experimentally determined (for a particular fluid and configuration of system 10) using suitably designed calibration experiments before being used by controller 12 to relate the pressure differential Δp (as provided by feedback signal 38) to the volumetric rate of flow Q and to thereby control system 10.

Returning to FIG. 1, feedback subsystem 30 of the illustrated embodiment represents one particular technique for providing controller 12 with information which may be used to estimate the flow rate at delivery node 32. Feedback system 30 of the illustrated embodiment is advantageous because it can be used to estimate extremely low flow rates and can thereby be used to control flow rates within extremely fine increments. In some embodiments, such increments can be on the order of 25 nl/s or less. In some embodiments, such increments can be on the order of 10 nl/s or less. Feedback system 30 of the illustrated embodiment is also advantageous because it can be used to estimate, and thereby control, flow rates over a relatively large range. In some embodiments, the controllable range of flow rates is between 10 μl/s-1000 μl/s. In some embodiments, the controllable range of flow rates is between 5 μl/s-200 μl/s.

While feedback subsystem 30 of the illustrated embodiment represents one particular technique for providing controller 12 with information which may be used to estimate the flow rate downstream of supply injector 14, other techniques may be possible. While the inventors have been unable to locate any other flow rate meters capable of measuring flow rate at the small increments desired for system 10, it is possible that other embodiments could comprise other flow rate sensors which may include, by way of non-limiting example, an ultrasonic or laser Doppler flow meter, an optical flow meter, a paddle wheel-based flow meter, a rotary piston flow meter, a rotameter, a mass flow meter, a thermal mass flow meter, or the like. In some embodiments, feedback subsystem 30 may be integrated with supply injector 14.

From restriction conduit 34, the additive fluid arrives at delivery node 32 and enters delivery conduit 40, where it is delivered through one way check valve 42 to host system 44 to be supplied. As discussed above, in particular embodiments, host system 44 may comprise a delivery system for a host fluid (not expressly enumerated). Where host system 44 comprises a host fluid, host system 44 will have a pressure head and the pressure of the additive fluid at delivery node 32 is desirably sufficient to overcome this pressure head and any other sources of fluidic resistance (e.g. delivery conduit 40 and check valve 42) between delivery node 32 and host system 44. However, in the illustrated embodiment of system 10, controller 12 controls the flow rate through restriction conduit 34 (as explained in more detail below). Consequently, the pressure at delivery node 32 can be allowed to vary to achieve this controlled flow rate. Control of the flow rate through restriction conduit 34 permits the use of delivery conduits 40 having different characteristics (e.g. lengths, diameters, fluidic accumulation characteristics or the like) while maintaining accurate control, provided that the pressure at supply node 16 is sufficient to allow the pressure at delivery node 32 to vary to accommodate these differences in delivery conduits 40.

The delivery of fluid by system 10 is subject to closed-loop control (i.e. feedback control). In operation, controller 12 will determine or be provided with a desired volumetric flow rate for supplying additive fluid to host system 44. In exemplary embodiments, this desired flow rate may be provided to controller 12 by a human operator (e.g. through a suitable user interface (not shown)) and/or by another system (e.g. host system 44 through a suitable communication link or the like (not shown)).

In one exemplary embodiment, controller 12 may determine the desired flow rate of additive fluid based on input information provided to controller 12. For example, in one embodiment, host system 44 comprises a delivery conduit (not shown) for a host fluid and controller 12 may be provided with information relating to the flow rate of the host fluid in the delivery conduit. Controller 12 may then determine a suitable flow rate for the additive fluid based on the flow rate of the host fluid. For example, it may be desirable to provide additive fluid at a flow rate that is proportional to (or has some other mathematically defined relationship to) the flow rate of the host fluid. Various techniques may be used to estimate the flow rate of the host fluid. In one example embodiment, a flow rate sensor may be provided in the host fluid delivery conduit and the flow rate information from this sensor may be provided to controller 12. In another example embodiment, a volume sensor may be provided in the host fluid delivery conduit (or in some other suitable location of host system 44) and this volume sensor may provide controller 12 with information about the volume of host fluid delivered. Controller 12 may in turn use this volume information to determine the flow rate of host fluid (e.g. by dividing the volume delivered by the time for delivery, by counting the time between delivery of known units of volume and/or the like). In some embodiments, desired steady state volumetric flow rates for additive fluid are less than 500 μl/s. In other embodiments, desired steady state volumetric flow rates for additive fluid are less than 100 μl/sec. In still other embodiments, desired steady state volumetric flow rates for additive fluid are less than 10 μl/sec.

With additive fluid from reservoir 24 being pressurized at supply node 16, controller 12 uses signal 26 to controllably open and close supply injector 14 causing additive fluid to flow through feedback subsystem 30, delivery conduit 40 and check valve 42 into host system 44. As discussed above, controller 12 uses feedback signal 38 from sensor 36 to estimate the volumetric flow rate of additive fluid through restriction conduit 34. Since fluid exiting restriction conduit 34 is supplied to system 44, the flow rate through restriction conduit 34 reflects the flow rate of additive fluid through delivery conduit 40 and into to system 44. If the flow rate estimated by controller 12 is too high, then controller 12 may output an appropriate value of signal 26 to close supply injector 14. If the flow rate estimated by controller 12 is too low, then controller 12 may output an appropriate value of signal 26 to open supply injector 14.

In some embodiments, controller 12 effects a type of pulse width modulation (PWM) control wherein if the flow rate estimated by controller 12 is too high, controller 12 outputs an appropriate value of signal 26 to reduce a duty cycle of supply injector 14 and if the flow rate estimated by controller 12 is too low, controller 12 outputs an appropriate value of signal 26 to increase a duty cycle of supply injector 14. PWM control involves sending suitable pulses or the like (via signal 26) which alternatingly open and close supply injector 14. The states of signal 26 intended to cause supply injector 14 to be open and closed may be respectively referred to as the signal 26ON and OFF states. A duration for which signal 26 is in an ON state between a pair of temporally adjacent OFF states may be referred to as an ON time. Conversely, a duration for which signal 26 is in an OFF state between a pair of temporally adjacent ON states may be referred to as an OFF time. The total time of a single signal 26ON state and a subsequent signal 26 OFF state may be referred to as the PWM period. It will be appreciated that supply injector 14 has ON (open) and OFF (closed) states and times and a PWM period which correspond generally to the ON and OFF states and times and PWM period of signal 26, but which may exhibit some lag (e.g. due to the mechanical nature of supply injector 14 being slower than the electronic nature of signal 26).

The duty cycle of signal 26 may be defined to be the ratio of the signal 26ON time to the PWM period. Similarly, the duty cycle of supply injector 14 may be defined to be the ratio of the supply injector 14ON time to the PWM period. Reducing the duty cycle of supply injector 14 may be effected by reducing the ON time of signal 26 (supply injector 14) within a PWM period and/or by increasing the PWM period. Conversely, increasing the duty cycle of supply injector 14 may be effected by increasing the ON time of signal 26 (supply injector 14) within a PWM period and/or by reducing the PWM period. In system 10, the PWM period for supply injector 14 may be selected to be relatively short. As explained in more detail below, when the PWM period of supply injector 14 is relatively short in comparison to the response times of system 10 downstream from supply injector 14, additive fluid is delivered relatively smoothly to host system 44. In some embodiments, the PWM period is less than or equal to 50 ms. In some embodiments, this PWM period is less than or equal to 20 ms. In still other embodiments, this PWM period is less than or equal to 10 ms. Ultimately, the lower limit of the PWM period may reflect the time that it takes for supply injector 14 to open and close. It is envisaged that with faster supply injectors 14, the PWM period could be less than or equal to 5 ms.

System 10 may exhibit fluid accumulation between supply injector 14 and host system 44. Such fluid accumulation may be related to the bulk modulus of the additive fluid (e.g. compression of the additive fluid) and/or to the elasticity of the various conduits between supply injector 14 and host system 44 (e.g. expansion and contraction of the conduits). In some embodiments, one or more components expressly designed to provide fluid accumulation may be provided in system 10 between supply injector 14 and host system 44. Because of effect of fluid accumulation, when supply injector 14 opens, fluid is not immediately supplied to host system 44 at the same flow rate as fluid flows through supply injector 14. In contrast, fluid tends to accumulate downstream of supply injector 14 for a period of time before the flow rate at which additive fluid is supplied to host system 44 reaches (at least approximately) the flow rate through supply injector 14. Similarly, when supply injector 14 closes, additive fluid may tend to continue to flow into host system 44 until the accumulated fluid downstream of supply injector 14 is dispensed.

The time that it takes for the fluid flow into host system 44 to increase to a steady state after supply injector 14 is opened and the time that it takes for the fluid flow into host system 44 to stop after supply injector 14 is closed may be referred to as the response times of system 10 downstream from supply injector 14. The response times of system 10 downstream from supply injector 14 in particular embodiments are on the order of 5-15 s. In some embodiments, the response times may be as low as 2 s or less. In currently preferred embodiments, the PWM period of supply injector 14 (or the iterative repetition period of system 10 (described further below)) during steady state controlled delivery of additive fluid is significantly less than the response times of system 10 downstream from supply injector 14. In some embodiments, the ratio of supply injector 14 PWM period (or the iterative repetition period) to the response times of system downstream from injector 14 during steady state controlled delivery of additive fluid is less than or equal to 1:10. In other embodiments, this ratio is less than or equal to 1:25. In still other embodiments, this ratio is less than or equal to 1:250.

System 10 makes use of the fluidic accumulation downstream from supply injector 14 to smooth out the controlled delivery of additive fluid to host system 44 while permitting extremely fine control increments. More particularly, controller 12 typically causes supply injector 14 to open and close relatively rapidly (e.g. a PWM period that is relatively short) in relation to the response times of system 10 downstream from supply injector 14. Because of the relatively high rate at which controller 12 switches supply injector 14 open and closed (e.g. the relatively short PWM period), controller 12 has a correspondingly high degree of control over the rate of fluid flow through injector 14 and can therefore control the flow rate of additive fluid in fine increments. On the other hand, because of fluid accumulation and the relatively long response times of system 10 downstream from supply injector 14, the instantaneous rate of additive fluid flow into host system 44 does not change as rapidly as supply injector 14 opens and closes. Instead, each time that supply injector 14 opens, the instantaneous rate of additive fluid flow into host system 44 starts to increase relatively slowly as fluid accumulates downstream of supply injector 14 until supply injector 14 closes again. Similarly, each time that supply injector 14 closes, the instantaneous rate of additive fluid flow into host system 44 starts to decrease relatively slowly as accumulated fluid drains from downstream of supply injector 14 until supply injector 14 opens again. In this way, the fluidic accumulation downstream of supply injector 14 smooths out the delivery of additive fluid to host system 44.

A feature of system 10 is the ability to controllably evacuate conduits downstream of supply injector 14 of accumulated fluid using optional controllable relief injector 46. In particular embodiments, relief injector 46 may be used to evacuate conduits downstream of supply injector 46 upon completion of a particular additive fluid delivery. By way of non-limiting example, completion of an additive fluid delivery may occur because controller 12 determines (or is provided with information indicating) that host system 44 has received a desired amount of additive fluid or that host system 44 has discontinued dispensing host fluid. In such circumstances, controller 12 may close supply injector 14 (using an appropriate value of signal 26) and may output an appropriate value of signal 48 to open relief injector 46. Opening relief injector 46 provides a low resistance fluid path back to reservoir 24 and thereby relatively rapidly drains accumulated fluid downstream from supply injector 14. Opening optional relief injector 46 at the same time as closing supply injector 14 in this manner causes the instantaneous rate of additive fluid flow into host system 44 to decrease relatively rapidly.

Figure 2:
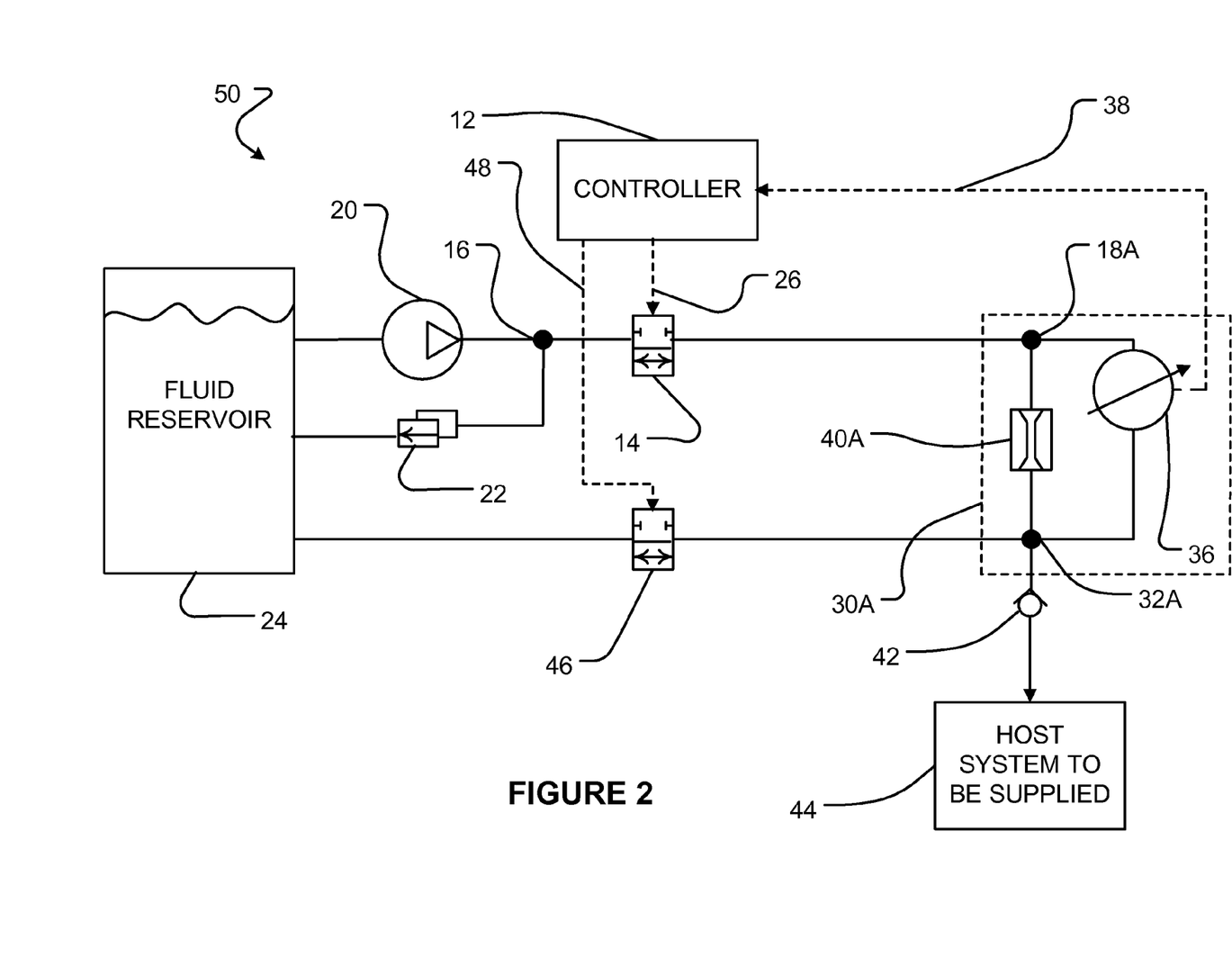
FIG. 2 is a schematic view of a fluid delivery system according to another example embodiment.

FIG. 2 is a schematic illustration of a fluid delivery system 50 according to another exemplary embodiment. System 50 is similar in many respects to system 10 discussed above. Parts common to system 10 and system 50 are marked using similar reference numerals. In system 50, delivery conduit 40A comprises a conduit with known geometry (e.g. interior diameter and length). In some embodiments, depending on flow rate, it may be desirable to have knowledge of some metric relating to surface characteristics (e.g. roughness) of the interior surface of delivery conduit 40A which may have an impact on flow rate estimation in turbulent flow conditions. Delivery conduit 40A forms part of feedback subsystem 30A wherein the pressure drop is measured across delivery conduit 40A by pressure sensor 36 to generate feedback signal 38 used by controller 12 to estimate the volumetric flow rate through delivery conduit 40A. In some embodiments, it is not necessary to know the exact geometry or roughness of delivery conduit 40A, as fluidic resistance values provided to and/or used by controller 12 may be calibrated (e.g. offset and/or scaled) or experimentally determined (for a particular fluid and configuration of system 50) using suitably designed calibration experiments.

Figure 3:
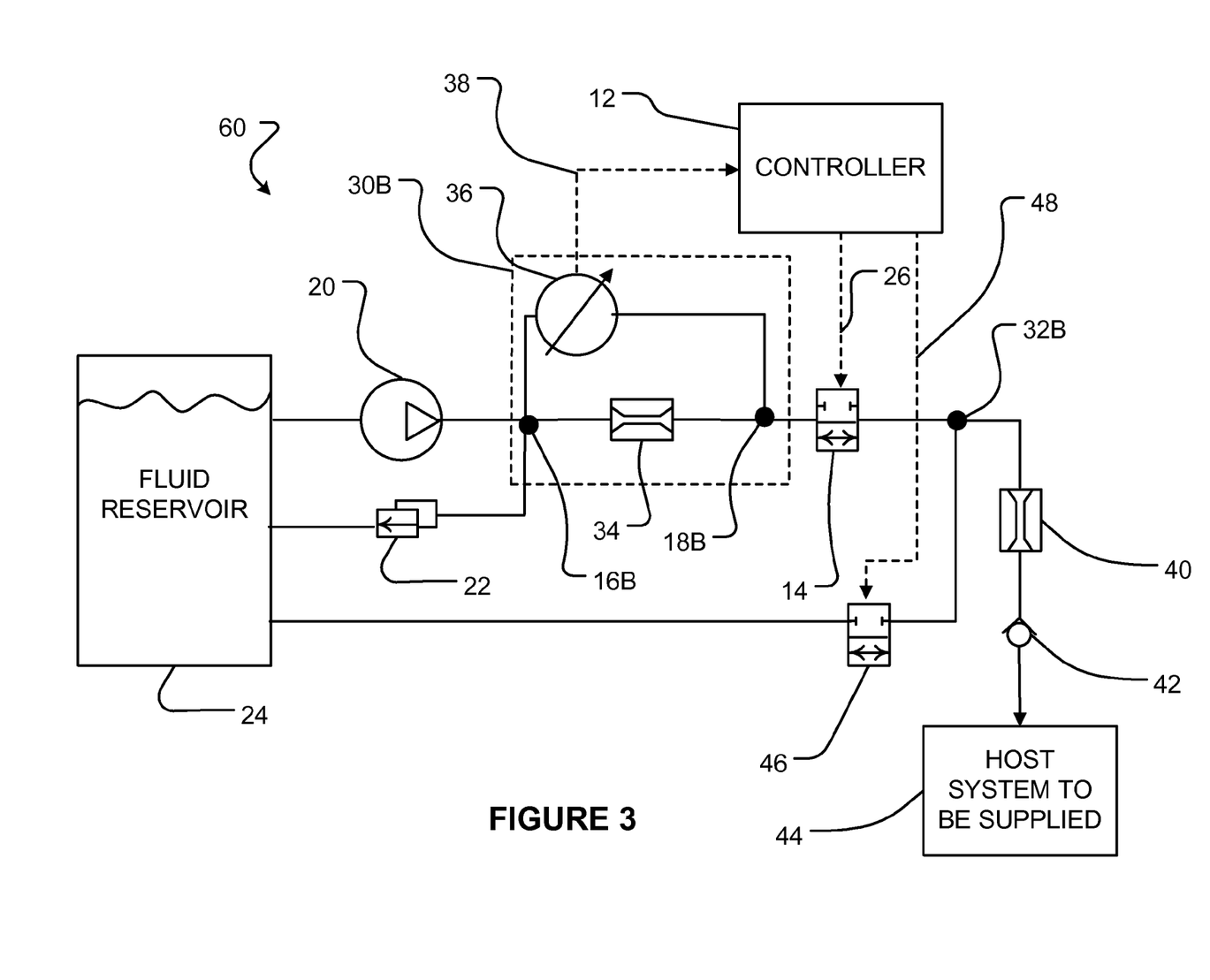
FIG. 3 is a schematic view of a fluid delivery system according to yet another example embodiment.

FIG. 3 is a schematic illustration of a fluid delivery system 60 according to another exemplary embodiment. System 60 is similar in many respects to system 10 discussed above. Parts common to system 10 and system 60 are marked using similar reference numerals. In system 60, feedback subsystem 30B is located upstream from supply injector 14. Feedback subsystem 30B provides feedback signal 38 which is used by controller 12 to estimate the rate of volumetric fluid flow through restriction conduit 34. Restriction conduit 34 of system 60 may be similar to restriction conduit 34 of system 10 described above. In comparison to system 10, system 60 may, in some circumstances, provide faster shut-down (i.e. when delivery of additive fluid is to stop) and may be less susceptible to hammering because restriction conduit 34 is upstream of supply injector 14.

In embodiments where the fluid pressure at one side of a differential pressure sensor is known to be, or can be assumed for practical purposes to be, relatively constant, differential pressure sensor 36 may be replaced by a single pressure sensor. For example, in system 60 (FIG. 3), since the pressure at supply node 16B may be assumed to be a relatively constant known value, as may be determined by pressure regulator 22, the pressure sensed by a single pressure sensor at regulated node 18B may be combined with the known pressure at supply node 16B to estimate the flow in restriction conduit 34. As another example, in system 50 (FIG. 2), if host system 44 has a relatively constant pressure head, then the pressure sensed by a single pressure sensor at regulated node 18A may be combined with the known pressure in system 44 to estimate the flow in delivery conduit 40A.

Figure 4:
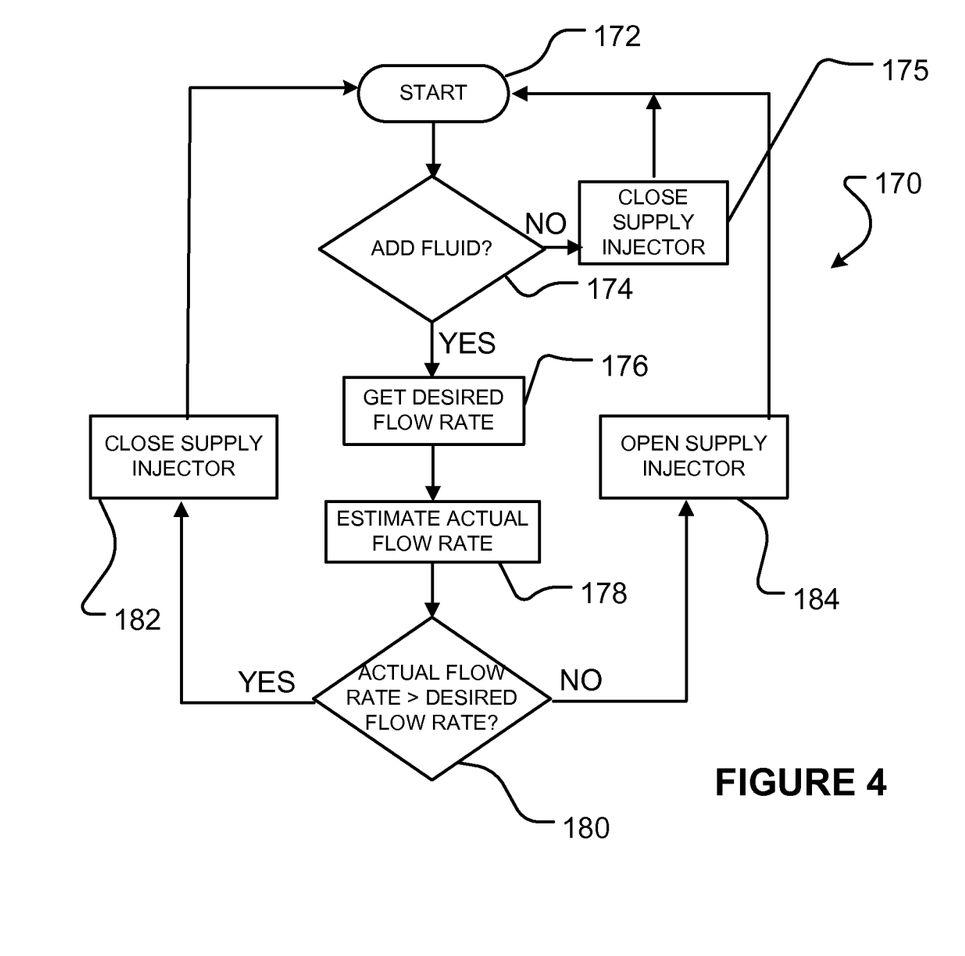
FIG. 4 is a flow chart of a method for controlling a fluid delivery system according to an example embodiment.

FIG. 4 shows a flow chart for a method 170 for controlling a fluid delivery system according to an example embodiment. Method 170 may be used to control systems 10, 50, 60 described above, for example. For the purposes of explanation, method 170 is described in relation to system 10, it being understood by those skilled in the art that method 170 may be suitably modified for use with systems 50, 60. Method 170 may be implemented at least in part by controller 12. After start block 172, method 170 proceeds to block 174 which involves evaluating whether additive fluid should be supplied to host system 44. Block 174 may involve evaluating the presence of a command provided to controller 12 (e.g. from a user or from another system (e.g. host system 44)) indicating that additive fluid should be dispensed into host system 44. Controller 12 may be programmed to input the external command from one of its inputs and to compare the to known command values accessible (e.g. in memory) to controller 12. Block 174 may additionally or alternatively involve controller 12 evaluating some other condition and determining that additive fluid should be dispensed. For example, in an embodiment where host system 44 involves delivery of a host fluid, controller may be provided with information indicating that host system 44 is delivering host fluid at a particular rate and with information indicating that for the particular delivery, additive fluid should or should not be added to the host fluid. Again, controller 12 may be programmed to evaluate such a condition by inputting the external information and comparing it to known command values.

If the block 174 evaluation determines that additive fluid should not be dispensed (block 172 NO output), then method 170 returns to start block 172 via block 175. In block 175, controller 12 may output a signal 26 which causes supply injector 14 to close, to the extent that supply injector 14 is not closed already. Such a value of signal 26 (i.e. a value which will cause supply injector 12 to close) may be accessible (e.g. in memory) to controller 12. Controller 12 may be programmed to output such value of signal 26. If the block 174 evaluation determines that additive fluid should be dispensed (block 174 YES output), then method 170 proceeds to block 176 which involves determining a desired flow rate of additive fluid. In some embodiments, the block 176 desired flow rate may be pre-determined or otherwise pre-calibrated and may be stored in a memory or the like that is accessible to controller 12. In some embodiments, the block 176 desired flow rate may be provided to controller 12 from an external source, such as by user input or some external system (e.g. host system 44), for example. Controller 12 may be programmed to retrieve such a desired flow rate value from memory or to input such a desired flow rate value. In other embodiments, controller 12 may determine the block 176 desired flow rate of additive fluid based on other criteria. In one particular embodiment, controller 12 is provided with information about the flow rate that host fluid is being dispensed from host system 44 and uses this information to determine the block 176 desired additive fluid flow rate (e.g. based on a mathematical relationship between the desired additive fluid flow rate for a given host fluid flow rate). In this embodiment, controller 12 may be programmed to input the flow rate information about the rate that host fluid is being dispensed from host system 44 and to compute a mathematical function of this flow rate information.

Method 170 then proceeds to block 178 which involves estimating the actual flow rate of additive fluid into host system 44. As discussed above, the block 178 actual additive fluid flow rate Q may be estimated by measuring differential pressure $\Delta P$ across restriction conduit 34 or in accordance with any of the other flow rate estimation or measurement techniques discussed above. In some embodiments, controller 12 may retrieve a value of the fluidic resistance R which may be accessible (e.g. in a look up table in memory) to controller 12, input the differential pressure $\Delta P$ from feedback signal 38 and compute the flow rate Q according to equation (1). As discussed above, controller 12 may be programmed to check the flow rate that it has computed by computing the Reynolds number or using the flow rate that it computed to ensure that the correct value of the fluidic resistance was used to perform the computation. If controller determines that the incorrect value of the fluidic resistance was used, then controller 12 may perform the equation (1) computation again with a different value of the fluidic resistance. Method 170 then proceeds to block 180 which involves comparing the block 178 actual flow rate with the block 176 desired flow rate. Controller 12 may be programmed to make such a comparison between the output of blocks 176 and 178. If the actual flow rate is greater than the desired flow rate (block 180 YES output), then method 170 proceeds to block 182 which involves outputting a suitable signal 26 to close supply injector 14 before looping back to block 172. Controller 12 may be programmed to retrieve such a value of signal 26 (e.g. from memory) and to output this signal 26. On the other hand, if the actual flow rate is less than the desired flow rate (block 180 NO output), then method 170 proceeds to block 184 which involves outputting a suitable signal 26 to open supply injector 14 before looping back to block 172. Controller 12 may be programmed to retrieve such a value of signal 26 (e.g. from memory) and to output this signal 26.

The estimation of actual flow rate in block 178 may comprise an instantaneous flow rate estimation (e.g. an estimation based on a difference between instantaneous pressure measurements or the like). In some embodiments, the actual flow rate estimation of block 178 comprises a time lapse flow rate estimation (e.g. an estimation based on a moving average filter or some other average of instantaneous pressure measurements or the like). In some such embodiments, the measurement period for the time lapse flow rate estimation occurs entirely during block 178, such that method 170 remains at block 178 for at least the measurement period. In other embodiments, the measurement period comprises measurements (instantaneous or time lapse) obtained before entry into block 178. For example, in some embodiments, the block 178 flow rate estimation may be based in part on measurements obtained in a previous iteration of method 170.

In some embodiments, method 170 comprises one or more waiting steps (not shown) which cause method 170 to pause and prevent or minimize undesirably fast switching of supply injector 14. Within method 170, such waiting steps may be situated, for example, between blocks 182 and 172, and/or between blocks 184 and 172. The duration of a waiting step may be fixed or may be variable. In some embodiments, the during of a waiting step is based on the comparison of the estimated actual flow rate and the desired flow rate. For example, the duration of the waiting step may be proportional to (or correlated with) the difference between the estimated actual flow rate and the desired flow rate. Waiting steps may minimize undesirably fast changes to the state of supply injector 14 which may be caused, for example, by measurement noise in the block 178 flow rate estimate. Changing the state of supply injector 14 too frequently may impair the performance and decrease the performance lifetime of supply injector 14. Waiting steps are not necessary. In some embodiments, method 170 proceeds continually (i.e. without waiting steps) to minimize the duration of feedback loops.

The time (with or without waiting steps) for method 170 to loop from block 172 through to the block 180 evaluation and back to block 172 through either block 182 or block 184 may be referred to herein as the iterative repetition period of method 170. In some embodiments, the ratio of the iterative repetition period to the response times of system downstream from injector 14 during steady state controlled delivery of additive fluid is less than or equal to 1:10. In other embodiments, this ratio is less than or equal to 1:25. In still other embodiments, this ratio is less than or equal to 1:250.

As discussed above, block 174 involves an evaluation of whether additive fluid should be dispensed into host system 44. In some embodiments, where the corresponding system is provided with a relief valve 46, it may be desirable to activate relief valve 46 to drain accumulated fluid downstream of supply injector 14 when additive fluid has been supplied to host system 44 for a period of time and then it is determined that additive fluid should no longer be supplied (e.g. where the block 174 evaluation has been a YES output for one or more previous iterations and then switches to a NO output). In such embodiments and in such circumstances, the path corresponding to block 174 NO output may involve an optional evaluation (not shown) of whether relief valve 46 should be opened and if so may involve opening relief valve 46. By way of non-limiting example, conditions for which relief valve 46 should be opened may correspond to a threshold number of block 174 NO evaluations (or a threshold time) after a threshold number of block 174 YES evaluations (or a sustained time period of block 174 YES evaluations). In other embodiments, relief valve 46 may be opened automatically on any block 174 NO output (e.g. as a part of block 175) and may be automatically closed again on the next block 174 YES output. Opening relief valve 46 in these circumstances may counteract the effect of fluidic accumulation downstream of supply injector 14 by providing the accumulated fluid with a low pressure path back to reservoir 24. Otherwise, the additive fluid accumulated downstream of supply injector 14 may cause additive fluid to continue to flow into host system 44 for a period of time after a block 174 NO evaluation and supply injector 14 is closed in block 175. Such continued flow of additive fluid may cause a corresponding lack of precision and/or accuracy of the rate and/or amount of additive fluid added to host system 44.

The effect of fluidic accumulation can also have an impact at startup when additive fluid is first supplied to host system 44 after a period of inactivity (e.g. where the block 174 evaluation is a YES output after one or more iterations of being a NO output). In such circumstances, supply injector 14 will be opened in block 184, but the additive fluid may not immediately be introduced into host system 44 at the desired flow rate. Instead, the additive fluid may accumulate downstream of supply injector 14 for a period of time before being introduced into host system 44 at the desired rate. In some embodiments, control methods may compensate for this parasitic fluid accumulation effect at start up. In one particular example embodiment, when the block 174 evaluation switches from NO to YES (e.g. at the outset of an additive fuel delivery), controller 12 may output a signal 26 which causes supply injector 14 to be open regardless of the output of the block 180 evaluation—i.e. supply injector 14 is held open for a number of iterations (or a period of time) after the block 174 evaluation switches from NO to YES. In another particular example embodiment, when the block 174 evaluation switches from NO to YES (e.g. at the outset of an additive fuel delivery), the block 176 desired flow rate of additive fluid may be set higher than actually desired for a number of iterations (or a period of time) after the block 174 evaluation switches from NO to YES. These control techniques may help to counteract the effect of parasitic fluidic accumulation downstream of supply injector 14 at start up.

Figure 5:
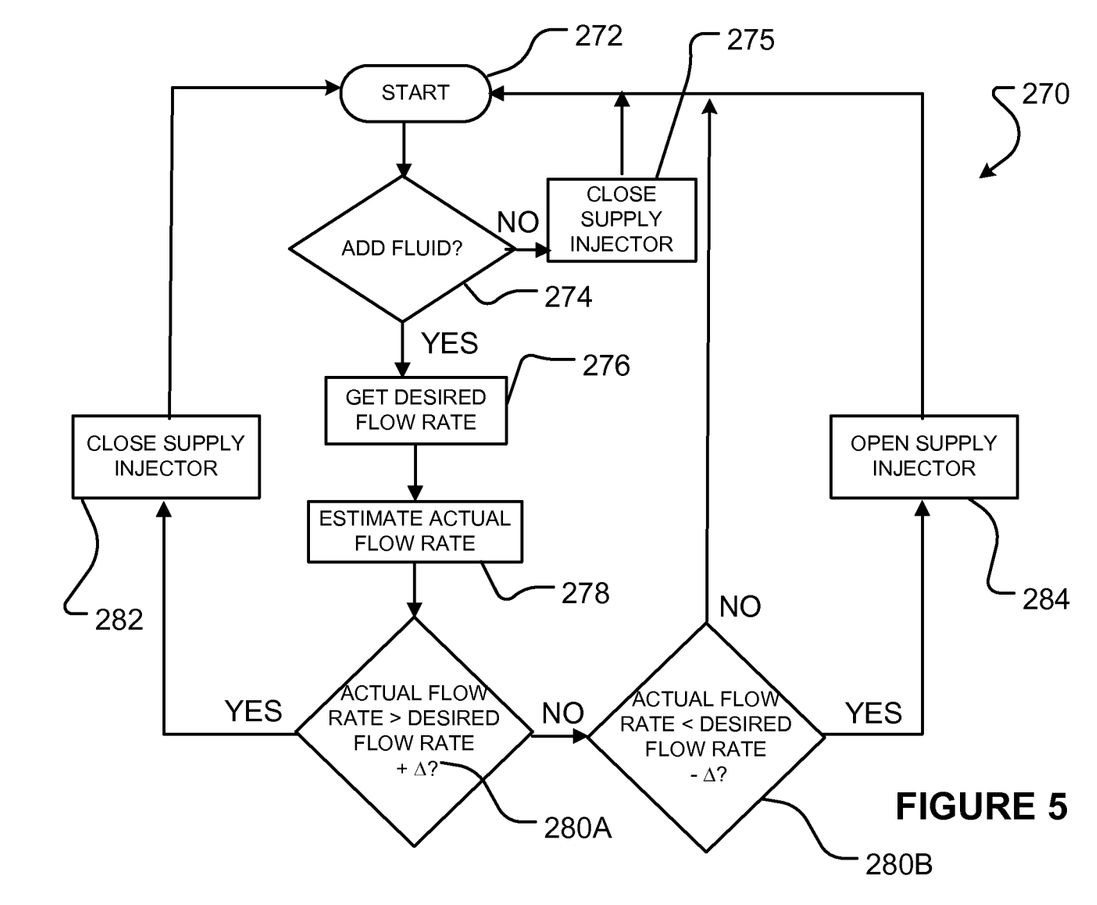
FIG. 5 is a flow chart of a method for controlling a fluid delivery system according to another example embodiment.

FIG. 5 shows a flow chart for a method 270 for controlling a fluid delivery system according to an example embodiment. Method 270 is similar to method 170 in many respects. Blocks of method 270 which are similar to those of method 170 are referenced using reference numerals similar to those of method 170 except the reference numbers of method 270 are preceded with the numeral "2" rather than "1". Method 270 differs from method 170 in that method 270 incorporates hysteresis (also referred to as a deadband) which prevents or minimizes undesirably fast switching of supply injector 14 due to measurement noise or the like. More particularly, block 180 of method 170 is replaced by a two part inquiry in blocks 280A, 280B. Block 280A involves evaluating whether the estimated actual flow rate (block 278) is greater than a desired flow rate (block 276) plus a buffer $\Delta_1$. If the block 280A comparison finds that the estimated actual flow rate is greater than the desired flow rate plus buffer $\Delta_1$, method 270 proceeds to block 282 where supply injector 14 is closed prior to looping back to block 272. If the block 280A comparison finds that the estimated actual flow rate is less than the desired flow rate plus buffer $\Delta_1$, method 270 proceeds to block 280B. At block 280B, the estimated actual flow rate is compared with the desired flow rate minus a buffer $\Delta_2$. If the block 280B comparison finds that the estimated actual flow rate is less than the desired flow rate minus buffer $\Delta_2$, then method 270 proceeds to block 284 where supply injector 14 is opened before looping back to block 272. If the block 280B comparison finds that the estimated actual flow rate is greater than the desired flow rate minus buffer $\Delta_2$, then the estimated actual flow rate is determined to be sufficiently close to the desired flow rate and method 270 returns to block 272 with the state of supply injector 14 left unchanged.

Buffers $\Delta_1$ and $\Delta_2$ may be the same or different. Buffers $\Delta_1$ and/or buffer $\Delta_2$ may be zero. Buffer $\Delta_1$ and/or buffer $\Delta_2$ may be configurable. In some embodiments, controller 12 may adjust buffer $\Delta_1$ and/or $\Delta_2$. Such adjustments may be based on input parameters, such as, for example, a desired flow rate, a specification of required precision, a specification of required accuracy, or the like. Such adjustments may also be based on system state information, such as, for example, estimated rate of fluid flow in the fluid delivery system, temperature, or the like.

Like method 170, the time (with or without waiting steps) for method 270 to loop from block 272 through to the block 280A evaluation and back to block 272 through either block 282, 280B NO output or block 280B YES output and block 284 may be referred to herein as the iterative repetition period of method 270. In some embodiments, the ratio of the iterative repetition period to the response times of system downstream from injector 14 during steady state controlled delivery of additive fluid is less than or equal to 1:10. In other embodiments, this ratio is less than or equal to 1:25. In still other embodiments, this ratio is less than or equal to 1:250.

Method 270 may be otherwise similar to method 170 described above.

Figure 6:
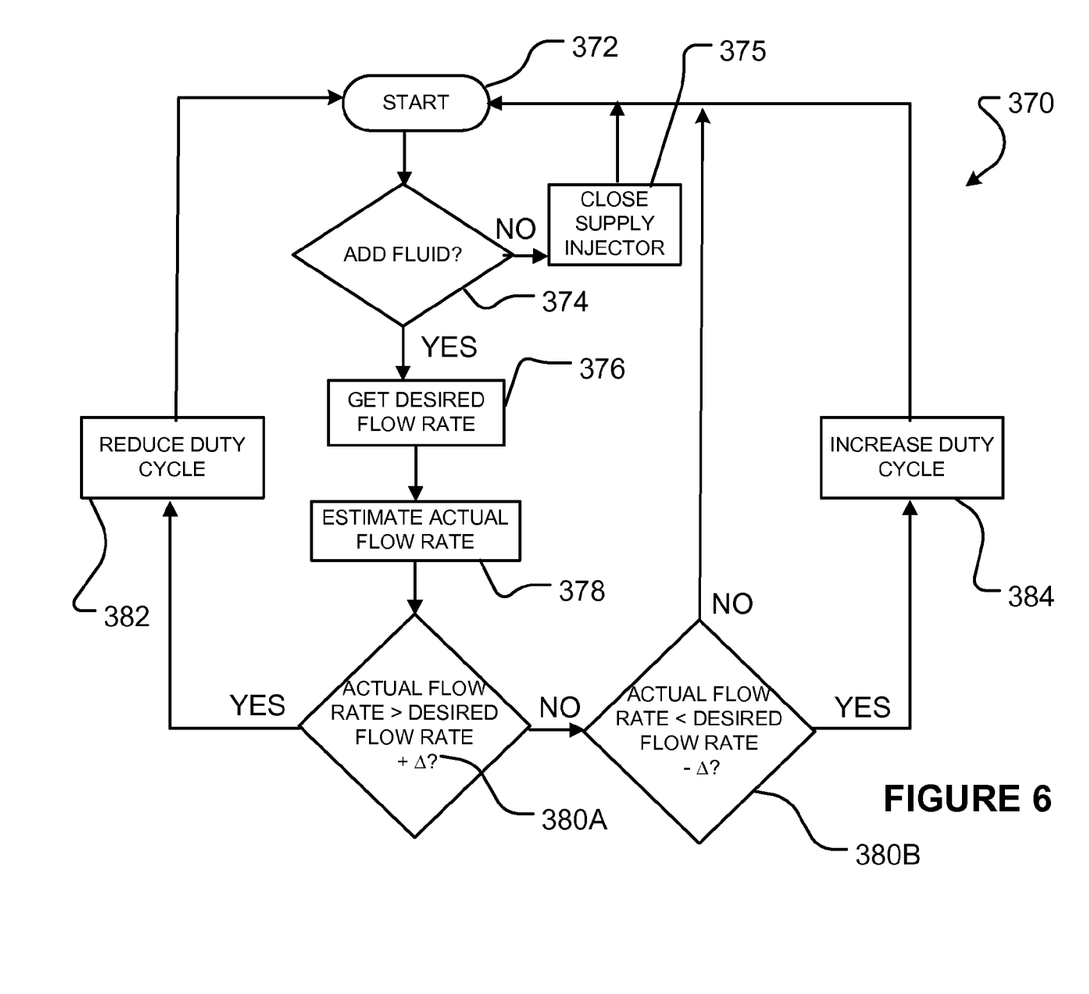
FIG. 6 is a flow chart of a method for controlling a fluid delivery system according to another example embodiment.

FIG. 6 shows a flow chart for a method 370 for controlling a fluid delivery system according to an example embodiment. Method 370 is similar to method 270 in many respects. Blocks of method 370 which are similar to those of method 270 are referenced using reference numerals similar to those of method 270 except the reference numbers of method 370 are preceded with the numeral "3" rather than "2". Method 370 differs from method 270 in that method 370 involves decreasing a PWM duty cycle in block 382 (rather than closing supply injector 14 in block 282) and increasing a PWM duty cycle in block 384 (rather than opening supply injector 14 in block 282).

As discussed above, decreasing the duty cycle of supply injector 14 (signal 26) in block 382 may involve decreasing the ON time of supply injector 14 (signal 26) or increasing the PWM period of supply injector 14 (signal 26). Deciding between decreasing the ON time and increasing the PWM period may involve consideration of the minimum switching time of supply injector 14. In some embodiments, it is desirable to maintain the ON time for steady state delivery of additive fluid above a minimum switching time of supply injector 14. In some embodiments, the ratio of the ON time of supply injector 14 to the minimum switching time of supply injector 14 for steady state delivery of additive fluid is maintained greater than or equal to 1.25. In some embodiments, this ratio is maintained greater than or equal to 1.5. Deciding between decreasing the ON time and increasing the PWM period may also involve consideration of the maximum PWM period that will be sufficiently short in relation to the response times to permit the smooth flow of additive fluid caused by fluidic accumulation as discussed above. It will be appreciated that as the PWM period approaches the system response times, the smoothing effect caused by fludiic accumulation is reduced. In some embodiments, it is desirable to maintain the PWM period for steady state delivery of additive fluid less than or equal to the response times downstream from supply injector 14. In some embodiments, the ratio of the PWM period to the downstream response times for steady state delivery of additive fluid is maintained less than or equal to 1:10. In some embodiments, this ratio is maintained less than or equal to 1:25. In still other embodiments, this ratio is maintained less than or equal to 1:250.

Increasing the duty cycle in block 384 may involve increasing the ON time of supply injector 14 (signal 26) or decreasing the PWM period of supply injector 14 (signal 26). Deciding between increasing the ON time and decreasing the PWM period may involve consideration of the minimum switching time of supply injector 14. In some embodiments, it is desirable to maintain the PWM period for steady state delivery of additive fluid above twice the minimum switching time for supply injector 14. Twice the minimum switching time for supply injector 14 may correspond to a minimum time for supply injector 14 to switch from an ON state to an OFF state and back to an ON state again. In some embodiments, the ratio of the PWM period to the time for supply injector 14 to switch from an ON state to an OFF state and back to an ON state again is maintained greater than or equal to 1.25. In some embodiments, this ratio is maintained greater than or equal to 1.5. Deciding between increasing the ON time and decreasing the PWM period may involve consideration of the minimum time required for supply injector 14 to switch from an ON state to an OFF state. In some embodiments, it is desirable to maintain the ON time below a level for steady state delivery of additive fluid wherein the corresponding OFF time is maintained above a minimum switching time of supply injector 14. In some embodiments, the ratio of the OFF time of supply injector 14 to the minimum switching time of supply injector 14 for steady state delivery of additive fluid is maintained greater than or equal to 1.25. In some embodiments, this ratio is maintained greater than or equal to 1.5.

Considering whether to adjust the ON time or the duty cycle in blocks 384 may also involve consideration of the heat generated in supply injector 14 by maintaining supply injector 14 in an ON state for too long or by switching supply injector 14 ON and OFF too quickly.

Method 370 may otherwise be similar to method 270 discussed above.

One example application for the systems and methods described herein involves adding small quantities of dye to fuel, thereby converting unmarked fuel to marked fuel. In one particular embodiment, the fluid in reservoir 24 comprises dye and host system 44 comprises fuel (e.g. gasoline or diesel fuel). The system can add dye during the delivery of the fuel, eliminating the need to maintain separate supplies of pre-marked and unmarked fuel. The system can be mounted on stationary fuel pumps or onto fuel delivery trucks. In such embodiments, host fuel delivery system 44 may provide controller 12 with an indicator of the delivery flow rate of fuel and controller 12 may use this fuel delivery flow rate to determine a desired additive fluid (dye) delivery flow rate (e.g. in block 176 or 276). The indicator of fuel delivery flow rate may be provided by a flow rate sensor in host system 44 or by a volume sensor which provides some indicator every time that a known volume (e.g. 1 liter) of fuel is dispensed.

Controller 12 may be implemented using various types of programmable controllers or processors. For example, controller 12 may comprise a suitably programmed computer, a suitably programmed embedded digital processor, a suitably programmed logic array (e.g. FPGA) or the like. Controller 12 may comprise more than one such controller or processor. Controller 12 may also include or otherwise have access to internal and/or external memory (not shown) which stores program information and the like. In some embodiments, controller 12 may be operatively connected (via suitable network interface(s) and network connection(s) to one or more remote workstation(s) and/or to other system(s). In such systems, part of the functionality of controller 12 may be implemented on such remote workstation(s) and/or system(s).

Certain implementations of the invention comprise computer processors which execute software instructions which cause the processors to perform a method of the invention. For example, controller 12 may comprise one or more processors that implement methods as described herein, as shown, for example, in FIGS. 4, 5 and 6, by executing software instructions from a program memory accessible to the processors. The invention may also be provided in the form of a program product. The program product may comprise any medium which carries a set of computer-readable data comprising instructions which, when executed by a data processor, cause the data processor to execute a method of the invention. Program products according to the invention may be in any of a wide variety of forms. The program product may comprise, for example, physical media such as solid state memory, magnetic data storage media including floppy diskettes, hard disk drives, optical data storage media including CD ROMs, DVDs, electronic data storage media including ROMs, flash RAM, or the like. The computer-readable data on the program product may optionally be compressed or encrypted.

Where a component (e.g. a controller, injector, sensor, subsystem, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

The embodiments described herein are only examples. Other example embodiments may be obtained, without limitation, by combining features of the disclosed embodiments. As will be apparent to those skilled in the art in the light of the foregoing disclosure, many alterations and modifications are possible in the practice of this invention without departing from the spirit or scope thereof. For example:

In some embodiments, it may be possible to control even larger ranges of additive fluid volumetric flow rates by providing systems 10, 50 or 60 with a plurality different lines which may be used to control different flow rate ranges. For example, controller 12 could cause a switch between first, second and third supply lines when the desired volumetric flow rate of additive fluid is 0-20 µl/s, 20-200 µl/s and greater than 200 µl/s. Each of these supply lines could be connected in fluid communication with node pressurized supply node 16 and may comprise its own supply injector and feedback subsystem.

Accordingly, the invention should be construed in accordance with the following claims or claims hereafter introduced.

What is claimed is:

1. A method for controllably delivering an additive fluid into a host fluid in a target system at a desired volumetric flow rate, the method comprising:
providing a binary supply injector connected in an additive fluid delivery system between a pressurized supply of the additive fluid and the target system, the binary supply injector being controllable between an ON state which permits flow of the additive fluid therethrough and an OFF state which prevents flow of the additive fluid therethrough;
iteratively repeating:
(a) estimating a volumetric flow rate of the additive fluid between the pressurized supply and the target system;
(b) if the estimated volumetric flow rate is greater than the desired volumetric flow rate, controlling the supply injector to its OFF state; and (c) if the estimated volumetric flow rate is less than the desired volumetric flow rate, controlling the supply injector to its ON state;

wherein each iterative repetition of steps (a), (b) and (c) further comprises:

evaluating whether any additive fluid should be delivered to the target system prior to performing steps (a), (b) and (c); and if the evaluation determines that additive fluid should be delivered to the target system, then performing steps (a), (b) and (c);

but if the evaluation determines that additive fluid should not be delivered to the target system, then:

controlling the supply injector to its OFF state; and controlling a relief injector connected downstream of the supply injector to an ON state to provide a low pressure fluid path downstream of the supply injector and to thereby drain additive fluid accumulated downstream of the supply injector; and wherein evaluating whether any additive fluid should be delivered to the target system comprises:

receiving a first signal from the target system indicating whether the host fluid is flowing in the target system;

receiving a second signal indicating whether it is desirable that the host fluid flowing in the target system receive the additive fluid; and concluding that additive fluid should be delivered to the target system only if the first signal indicates that the host fluid is flowing in the target system and the second signal indicates that it is desirable that the host fluid receive the additional fluid.

2. A method according to claim 1 wherein a portion of the additive fluid delivery system downstream of the supply injector comprises a response time associated with fluidic accumulation therein, the iterative repetition of steps (a), (b) and (c) occurs with an iterative repetition period and a ratio of the iterative repetition period to the response time is less than 1:10.

3. A method according to claim 1 wherein a portion of the additive fluid delivery system downstream of the supply injector comprises a response time associated with fluidic accumulation therein, the iterative repetition of steps (a), (b) and (c) occurs with an iterative repetition period and a ratio of the iterative repetition period to the response time is less than 1:25.

4. A method according to claim 1 wherein a pressure of the additive fluid at a delivery node downstream from the supply injector is permitted to vary in a range between a pressure of the additive fluid at the pressurized supply and a pressure of a pressure head of the host fluid in the target system to permit controllable delivery of the additive fluid into the host fluid at the desired volumetric flow rate.

5. A method according to claim 1 wherein the desired volumetric flow rate of additive fluid is determined dynamically and each iterative repetition further comprises: (d) determining the desired volumetric flow rate of additive fluid.

6. A method according to claim 5 wherein determining the desired volumetric flow rate of the additive fluid comprises: receiving information about a volumetric flow rate of the host fluid in the target system; and determining the desired volumetric flow rate of the additive fluid based on a mathematical relationship between the desired volumetric flow rate of the additive fluid and the volumetric flow rate of the host fluid.

7. A method according to claim 1 comprising:

for an initial period of time at the outset of delivery of the additive fluid into the host fluid, setting the desired volumetric flow rate of additive fluid to a temporary flow rate, the temporary flow rate greater than a nominal level of the desired volumetric flow rate of additive fluid; and after the initial period of time, returning the desired volumetric flow rate of additive fluid to its nominal level.

8. A method according to claim 7 wherein the initial period of time comprises an initial number of iterations of steps (a), (b) and (c).

9. A method according to claim 1 comprising:

for an initial period of time at the outset of delivery of the additive fluid into the host fluid and prior to a first iteration of steps (a), (b) and (c), controllably maintaining the supply injector in its ON state; and after the initial period of time, commencing iterative repetition of steps (a), (b) and (c) with the first iteration of steps (a), (b) and (c).

10. A method according to claim 1 wherein estimating the volumetric flow rate of the additive fluid between the pressurized supply and the target system comprises: measuring a pressure of the additive fluid at one or more locations downstream of the supply injector to thereby obtain an estimate of a differential pressure between upstream and downstream sides of a restriction conduit connected downstream of the supply injector in the additive fluid delivery system; and determining the volumetric flow rate of the additive fluid based at least in part on the differential pressure.

11. A method according to claim 1 wherein estimating the volumetric flow rate of the additive fluid between the pressurized supply and the target system comprises: measuring a pressure of the additive fluid at one or more locations upstream of the supply injector to thereby obtain an estimate of a differential pressure between upstream and downstream sides of a restriction conduit connected upstream of the supply injector in the additive fluid delivery system; and determining the volumetric flow rate of the additive fluid based at least in part on the differential pressure.

12. A method according to claim 1 wherein the desired volumetric flow rate is less than 1 µl/s.

13. A method according to claim 12 wherein a controllable increment of the volumetric flow rate of additive fluid is less than 25 nl/sec.

14. A method according to claim 1 wherein a controllable range of the volumetric flow rate of additive fluid to a controllable increment of the volumetric flow rate of additive fluid is 3,600:1 or greater.

15. A method for controllably delivering an additive fluid into a host fluid in a target system at a desired volumetric flow rate, the method comprising:

providing a binary supply injector connected in an additive fluid delivery system between a pressurized supply of the additive fluid and the target system, the binary supply injector being controllable between an ON state which permits flow of the additive fluid therethrough and an OFF state which prevents flow of the additive fluid therethrough;

iteratively repeating:

(a) estimating a volumetric flow rate of the additive fluid between the pressurized supply and the target system;

(b) if the estimated volumetric flow rate is greater than the desired volumetric flow rate plus an first offset ($\Delta_1$), fully closing the supply injector to its OFF state;

(c) if the estimated volumetric flow rate is less than the desired volumetric flow rate minus a second offset ($\Delta_2$), fully opening the supply injector to its ON state; and (d) if the estimated volumetric flow rate is between the desired volumetric flow rate plus the first offset ($\Delta_1$) and the desired volumetric flow rate minus the second offset ($\Delta_2$), leaving the state of the supply injector unchanged;

wherein each iterative repetition of steps (a), (b) and (c) further comprises:
  evaluating whether any additive fluid should be delivered to the target system prior to performing steps (a), (b) and (c); and
  if the evaluation determines that additive fluid should be delivered to the target system, then performing steps (a), (b) and (c);
  but if the evaluation determines that additive fluid should not be delivered to the target system, then:
    controlling the supply injector to its OFF state; and
    controlling a relief injector connected downstream of the supply injector to an ON state to provide a low pressure fluid path downstream of the supply injector and to thereby drain additive fluid accumulated downstream of the supply injector; and
  wherein evaluating whether any additive fluid should be delivered to the target system comprises:
    receiving a first signal from the target system indicating whether the host fluid is flowing in the target system;
    receiving a second signal indicating whether it is desirable that the host fluid flowing in the target system receive the additive fluid; and
    concluding that additive fluid should be delivered to the target system only if the first signal indicates that the host fluid is flowing in the target system and the second signal indicates that it is desirable that the host fluid receive the additional fluid.

16. A method according to claim 15 wherein a portion of the additive fluid delivery system downstream of the supply injector comprises a response time associated with fluidic accumulation therein, the iterative repetition of steps (a), (b), (c) and (d) occurs with an iterative repetition period and a ratio of the iterative repetition period to the response time is less than 1:10.

17. A method according to claim 15 wherein a portion of the additive fluid delivery system downstream of the supply injector comprises a response time associated with fluidic accumulation therein, the iterative repetition of steps (a), (b), (c) and (d) occurs with an iterative repetition period and a ratio of the iterative repetition period to the response time is less than 1:25.

18. A method according to claim 15 comprising:
  for an initial period of time at the outset of delivery of the additive fluid into the host fluid, setting the desired volumetric flow rate of additive fluid to a temporary flow rate, the temporary flow rate greater than a nominal level of the desired volumetric flow rate of additive fluid; and
  after the initial period of time, returning the desired volumetric flow rate of additive fluid to its nominal level.

19. A method according to claim 18 wherein the initial period of time comprises an initial number of iterations of steps (a), (b), (c) and (d).

20. A method according to claim 15 comprising:
  for an initial period of time at the outset of delivery of the additive fluid into the host fluid and prior to a first iteration of steps (a), (b), (c) and (d), controllably maintaining the supply injector in its ON state; and
  after the initial period of time, commencing iterative repetition of steps (a), (b), (c) and (d) with the first iteration of steps (a), (b), (c) and (d).

21. A method according to claim 15 wherein at least one of the first offset ($\Delta_1$) and the second offset ($\Delta_2$) is positive.

22. A method according to claim 21 wherein a portion of the additive fluid delivery system downstream of the supply injector comprises a response time associated with fluidic accumulation therein, the iterative repetition of steps (a), (b), (c) and (d) occurs with an iterative repetition period and a ratio of the iterative repetition period to the response time is less than 1:10.

23. A method according to claim 21 wherein a portion of the additive fluid delivery system downstream of the supply injector comprises a response time associated with fluidic accumulation therein, the iterative repetition of steps (a), (b), (c) and (d) occurs with an iterative repetition period and a ratio of the iterative repetition period to the response time is less than 1:25.

24. A method according to claim 21 comprising:
  for an initial period of time at the outset of delivery of the additive fluid into the host fluid, setting the desired volumetric flow rate of additive fluid to a temporary flow rate, the temporary flow rate greater than a nominal level of the desired volumetric flow rate of additive fluid; and
  after the initial period of time, returning the desired volumetric flow rate of additive fluid to its nominal level.

25. A method according to claim 24 wherein the initial period of time comprises an initial number of iterations of steps (a), (b), (c) and (d).

26. A method according to claim 21 comprising:
  for an initial period of time at the outset of delivery of the additive fluid into the host fluid and prior to a first iteration of steps (a), (b), (c) and (d), controllably maintaining the supply injector in its ON state; and
  after the initial period of time, commencing iterative repetition of steps (a), (b), (c) and (d) with the first iteration of steps (a), (b), (c) and (d).

27. A method according to claim 15 wherein both of the first offset ($\Delta_1$) and the second offset ($\Delta_2$) are positive.

* * * * *